US009661285B2

(12) United States Patent
Miyamae et al.

(10) Patent No.: US 9,661,285 B2
(45) Date of Patent: May 23, 2017

(54) PROJECTOR WITH MULTIPLE TYPES OF LIGHT SOURCES

(71) Applicant: SEIKO EPSON CORPORATION, Tokyo (JP)

(72) Inventors: Akira Miyamae, Fujimi-machi (JP); Takayuki Matsubara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 261 days.

(21) Appl. No.: 14/446,720

(22) Filed: Jul. 30, 2014

(65) Prior Publication Data

US 2015/0042961 A1 Feb. 12, 2015

(30) Foreign Application Priority Data

Aug. 9, 2013 (JP) ................. 2013-166670

(51) Int. Cl.
    *G03B 21/20* (2006.01)
    *H04N 9/31* (2006.01)
    *G02B 27/14* (2006.01)
    *G02B 27/30* (2006.01)
    *G02B 27/28* (2006.01)

(52) U.S. Cl.
    CPC ......... *H04N 9/3105* (2013.01); *G02B 27/149* (2013.01); *G03B 21/204* (2013.01); *H04N 9/3158* (2013.01); *H04N 9/3161* (2013.01); *H04N 9/3164* (2013.01); *G02B 27/285* (2013.01); *G02B 27/30* (2013.01)

(58) Field of Classification Search
    CPC ........ G03B 21/14; G03B 21/20; G03B 21/00; H04N 9/31; H04N 5/74
    See application file for complete search history.

(56) References Cited

U.S. PATENT DOCUMENTS

| 8,147,068 B2 | 4/2012 | Suzuki et al. |
| 8,562,146 B2 | 10/2013 | Kitano et al. |
| 2011/0228232 A1* | 9/2011 | Sakata ................... G02B 7/008 353/31 |
| 2011/0234998 A1* | 9/2011 | Kurosaki ............... G03B 21/14 353/85 |
| 2012/0236264 A1* | 9/2012 | Akiyama ........... G03B 21/2013 353/37 |

FOREIGN PATENT DOCUMENTS

| JP | A-2008-268581 | 11/2008 |
| JP | A-2011-65770 | 3/2011 |
| JP | A-2012-108486 | 6/2012 |

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector includes a first light source apparatus, a second light source apparatus, a laser light source apparatus, a first light modulator, a second light modulator, a third light modulator that modulates light from the laser light source apparatus, a cross prism that combines first image light, second image light, and third image light formed by the respective light modulators with one another, and a secondary light source image formation system that forms a secondary light source image on an optical path between the laser light source apparatus and the third light modulator, and the secondary light source image is so shaped that the length thereof in a direction perpendicular to a central intersection line of the cross prism is longer than the length thereof in a direction parallel to the central intersection line.

8 Claims, 10 Drawing Sheets

PROJECTOR WITH MULTIPLE TYPES OF LIGHT SOURCES

BACKGROUND

1. Technical Field

The present invention relates to a projector.

2. Related Art

In a projector using a cross dichroic prism as a color light combining section, a shadow of the intersection at the center of the cross dichroic prism is displayed on a screen, undesirably resulting in a decrease in quality of an image displayed by the projector.

To address the problem described above, a configuration in which a diffuser plate is disposed in a position between a light source and a light valve and the diffuser plate diffuses light outputted from the light source to reduce the degree of influence of the shadow of the intersection of the cross dichroic prism has been proposed (see JP-A-2008-268581, for example).

In a projector of the type described above, when a laser light source is used as the light source, the diffuser plate needs to be so configured that it diffuses the laser light at large angles because laser light has high directivity. When the diffuser plate is so configured that it diffuses the laser light at large angles, however, light diffused at large angles departs from the optical path, undesirably resulting in a decrease in light usage efficiency.

SUMMARY

An advantage of some aspects of the invention is to provide a projector that allows reduction in the degree of influence of a shadow of an intersection of a cross dichroic prism and excels in light usage efficiency.

An aspect of the invention relates to a projector including a first light source apparatus, a second light source apparatus, a laser light source apparatus, a first light modulator that modulates light from the first light source apparatus to form first image light, a second light modulator that modulates light from the second light source apparatus to form second image light, a third light modulator that modulates light from the laser light source apparatus to form third image light, a cross prism that combines the first image light, the second image light, and the third image light with one another, a projection system that projects light from the cross prism, and a secondary light source image formation system that forms a secondary light source image on an optical path between the laser light source apparatus and the third light modulator, wherein the secondary light source image is so shaped that the length thereof in a direction perpendicular to a central intersection line of the cross prism is longer than the length thereof in a direction parallel to the central intersection line.

According to the projector of the aspect of the invention, the length of the secondary light source image in the direction perpendicular to the central intersection line of the cross prism can be sufficiently long. Light incident on the central intersection line of the cross prism is therefore distributed over a wide range in the direction perpendicular to the central intersection line of the cross prism. As a result, a shadow formed by the central intersection line is greatly diffused in the direction perpendicular to the central intersection line of the cross prism. When diffused, the shadow becomes lighter, which means that the shadow becomes less visible, whereby a decrease in quality in an image displayed by the projector can be reduced.

Further, according to the projector of the aspect of the invention, since the shape of the secondary light source image with respect to the central intersection line of the cross prism relates to reduction in the degree of influence of the shadow of the central intersection line of the cross prism, the light is not required to excessively spread. As a result, the light will not depart from the optical axis, whereby the projector provided in accordance with the aspect excels in light usage efficiency.

The secondary light source image formation system may include a collimator lens on which the light from the laser light source apparatus is incident and a collector lens that collects light having exited out of the collimator lens to form the secondary light source image.

According to the configuration described above, since the collimator lens and the collector lens can be used to form the secondary light source image having the shape described above, whereby the secondary light source image can be readily formed.

The laser light source apparatus may have a slit-shaped laser emitting portion. The position of the slit-shaped laser emitting portion of the laser light source apparatus may be shifted from a focal position of the collimator lens by a predetermined distance. A longitudinal direction of the laser emitting portion of the laser light source apparatus may be parallel to the central intersection line of the cross prism.

According to the configuration described above, since the position of the laser emitting portion of the laser light source apparatus is shifted from the focal position of the collimator lens by a predetermined distance, the secondary light source image formed by the collector lens has the shape of a far field pattern (FFP) of the light from the laser light source apparatus. Since the laser emitting portion of the laser light source apparatus has a slit-like shape, the FFP of the light from the laser light source apparatus has an elliptical shape elongated in the width direction of the slit. Since the longitudinal direction of the laser emitting portion of the laser light source apparatus is parallel to the central intersection line of the cross prism, the longitudinal direction of the FFP is perpendicular to the central intersection line of the cross prism. Therefore, according to the configuration described above, the secondary light source image can be so shaped that the length thereof in the direction perpendicular to the central intersection line of the cross prism is longer than the length thereof in the direction parallel to the central intersection line.

The laser light source apparatus may have a slit-shaped laser emitting portion. The position of the slit-shaped laser emitting portion of the laser light source apparatus may coincide with a focal position of the collimator lens. A longitudinal direction of the laser emitting portion of the laser light source apparatus may be perpendicular to the central intersection line of the cross prism.

According to the configuration described above, since the position of the laser emitting portion of the laser light source apparatus coincides with the focal position of the collimator lens, the secondary light source image formed by the collector lens has the shape of the NFP of the light from the laser light source apparatus, that is, the shape of the slit-shaped laser emitting portion of the laser light source apparatus. Therefore, according to the configuration described above, in which the longitudinal direction of the laser emitting portion of the laser light source apparatus is perpendicular to the central intersection line of the cross prism, the secondary light source image can be so shaped that the length thereof in the direction perpendicular to the central intersection line of the cross prism is longer than the length thereof in the direction parallel to the central intersection line.

The projector may further include a tertiary light source image formation system on which light from the secondary light source image is incident and which forms a plurality of tertiary light source images and a lens array having a plurality of light incident ports on which light from the tertiary light source image formation system is incident, and the length of each of the plurality of tertiary light source images in the direction perpendicular to the central intersection line of the cross prism may be greater than or equal to 50% but smaller than or equal to 110% of the length of each of the plurality of light incident ports in the direction perpendicular to the central intersection line of the cross prism.

The length of each of the plurality of tertiary light source images in the direction perpendicular to the central intersection line of the cross prism may be greater than or equal to 50% but smaller than or equal to 100% of the length of each of the plurality of light incident ports in the direction perpendicular to the central intersection line of the cross prism.

The length of each of the plurality of tertiary light source images in the direction perpendicular to the central intersection line of the cross prism may be greater than or equal to 80% but smaller than or equal to 100% of the length of each of the plurality of light incident ports in the direction perpendicular to the central intersection line of the cross prism.

According to the configurations described above, the degree of influence of a shadow of the central intersection line of the cross prism can be effectively reduced.

The length of each of the plurality of tertiary light source images in the direction parallel to the central intersection line of the cross prism may be smaller than the length of each of the plurality of light incident ports in the direction parallel to the central intersection line of the cross prism.

According to the configuration described above, it is possible to control spread of incident light out of the light incident ports in the direction parallel to the central intersection line of the cross prism. Therefore, according to the configuration described above, a decrease in light usage efficiency can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The scope of the invention is not limited to the following embodiments, which can be arbitrarily changed to the extent that the changes fall within the technical spirit of the invention. Further, in the following drawings, the scale, the number, and other factors in each structure may differ from those in an actual structure in some cases for ease of illustration of each configuration.

First Embodiment

Figure 1:
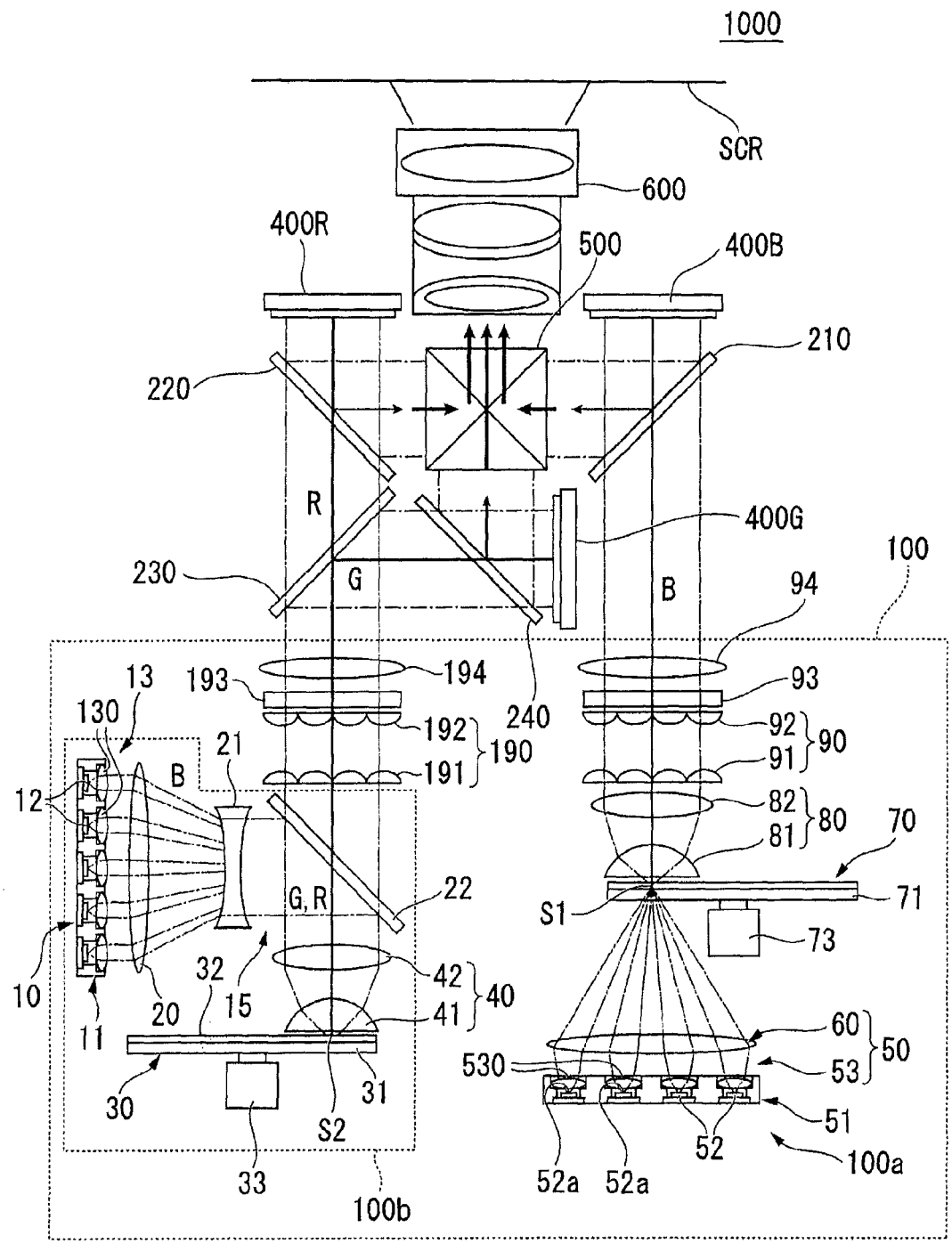
FIG. 1 is a diagrammatic view showing a projector according to a first embodiment.

FIG. 1 is a diagrammatic view showing a projector 1000 according to the present embodiment.

The projector 1000 according to the present embodiment includes an illumination unit 100, a light modulator (first light modulator) 400R, a light modulator (second light modulator) 400G, a light modulator (third light modulator) 400B, a reflective polarizer 210, reflective polarizer 220, a dichroic mirror 230, reflective polarizer 240, a cross dichroic prism (cross prism) 500, and a projection system 600.

The illumination unit 100 includes a laser light source apparatus 100*a*, a secondary light source image formation system 50, a rotary diffuser plate 70, a first pickup system 80, a first fly's eye optical integration system 90, a first polarizing beam splitter (polarizing beam splitter, or polarization conversion element) 93, a first parallelizing lens 94, a wavelength-conversion-type light source apparatus 100*b*, a second fly's eye optical integration system 190, a second polarizing beam splitter 193, and a third parallelizing lens 194. In the present embodiment, the wavelength-conversion-type light source apparatus 100*b* serves as a first light source apparatus and a second light source apparatus.

The laser light source apparatus 100*a* outputs laser light. The laser light source apparatus 100*a* is a light source array including a first base 51 and a plurality of first solid-state light emitting devices 52 arranged in a plane on the first base 51. Each of the first solid-state light emitting devices 52 is a semiconductor laser that emits blue laser light (intensity of emitted light peaks at about 460 nm). Each of the first solid-state light emitting devices 52 may instead be a semiconductor laser that emits laser light the intensity of which peaks at a wavelength other than 460 nm.

Figure 2:
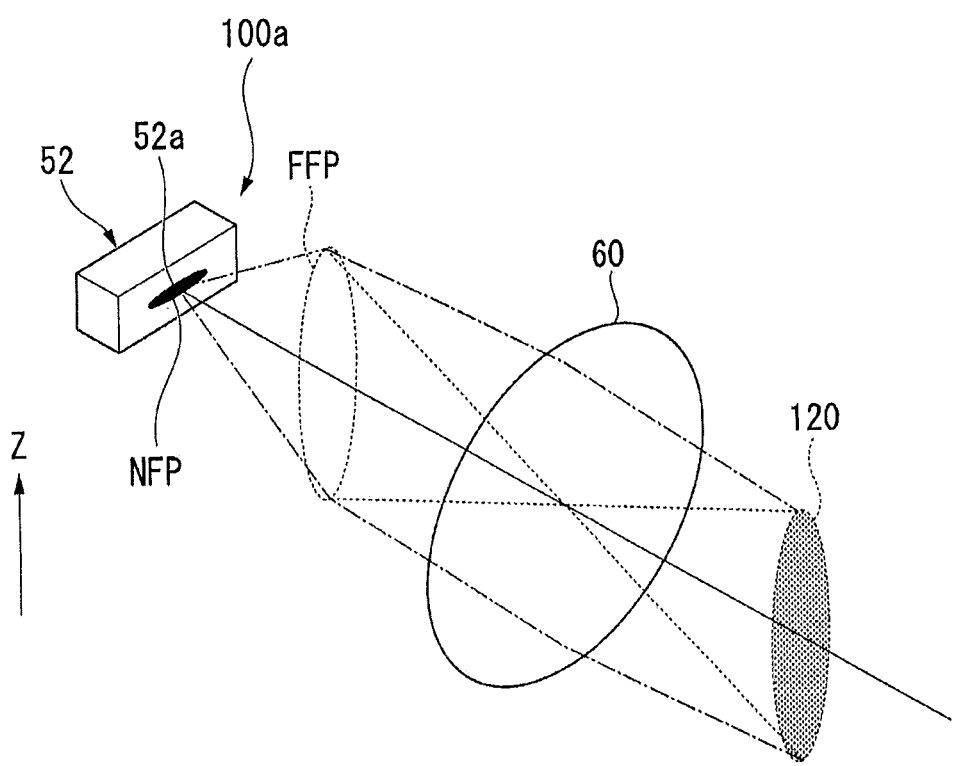
FIG. 2 is a diagrammatic view showing cross-sectional shapes of light outputted from a laser light source apparatus in the first embodiment.

FIG. 2 is a diagrammatic view showing cross-sectional shapes of the light emitted from one of the first solid-state light emitting devices 52 provided in the laser light source apparatus 100*a*.

In FIG. 2 and FIGS. 4 to 10, and 12, which will be described later, a Z axis is set and the positional relationships among components will be described with reference to the Z axis. In the present embodiment, the direction of the Z-axis is, for example, the vertical direction. Further, in the following description, a direction perpendicular to the Z-axis direction (vertical direction) is referred to as the horizontal direction or an X-axis direction in some cases.

The first solid-state light emitting device 52 has a laser emitting portion 52a having a slit-like shape or any other shape, as shown in FIG. 2. In the present embodiment, the first solid-state light emitting device 52 is, for example, so disposed that the longitudinal direction of the laser emitting portion 52a coincides with the horizontal direction (direction perpendicular to vertical direction (Z-axis direction)). Further, the cross dichroic prism 500 is so disposed that a central intersection line C thereof is oriented in the horizontal direction. As a result, the longitudinal direction of the laser emitting portion 52a of the first solid-state light emitting device 52 is parallel to the central intersection line C of the cross dichroic prism 500, which will be described later. The laser emitting portion 52a is, for example, so sized that the length thereof is 15 μm and the width thereof is 1 μm.

Now, assume that a light flux cross section that is perpendicular to the light traveling direction and contains the laser emitting portion 52a is superimposed on a light flux cross section that is perpendicular to the light traveling direction and contains the central intersection line C of the cross dichroic prism 500 to form an superimposed cross section. The situation in which the longitudinal direction of the laser emitting portion 52a is parallel to the central intersection line C of the cross dichroic prism 500 corresponds to a situation in which the longitudinal direction of the laser emitting portion 52a is parallel to the central intersection line C of the cross dichroic prism 500 in the superimposed cross section.

The secondary light source image formation system 50 includes a first collimator lens array 53 and a first collector lens 60, as shown in FIG. 1.

The first collimator lens array 53 has a plurality of collimator lenses 530 corresponding to the first solid-state light emitting devices 52 in a one-to-one relationship. The plurality of collimator lenses 530 are arranged on the first base 51. Each of the collimator lenses 530 is disposed on the optical path of the blue light emitted from the corresponding first solid-state light emitting device 52.

The positional relationship between the first collimator lens array 53 and the laser light source apparatus 100a is so set that the position of the laser emitting portion 52a of each of the first solid-state light emitting devices 52 is shifted from the focal position of the corresponding collimator lens 530 by a predetermined distance. In other words, the laser emitting portion 52a and the collimator lens 530 are in a defocused state. In the present embodiment, the first collimator lens array 53 and the laser light source apparatus 100a are so disposed that the position of the laser emitting portion 52a of each of the first solid-state light emitting devices 52 is shifted from the focal position of the corresponding collimator lens 530 toward the collimator lens 530. The predetermined distance of the shift from the focal position (hereinafter referred to as the amount of defocus in some cases) is, for example, greater than or equal to 125 μm but smaller than or equal to 250 μm. When the amount of defocus is set at, for example, 125 μm or greater, the degree of influence of a shadow of the central intersection line C of the cross dichroic prism 500 can be effectively reduced.

The first collimator lens array 53 and the laser light source apparatus 100a may instead be so disposed that the position of the laser emitting portion 52a of each of the first solid-state light emitting devices 52 is shifted from the focal position of the corresponding collimator lens 530 in the direction away from the collimator lens 530.

The blue light incident on the first collimator lens array 53 exits out thereof toward the first collector lens 60. In this process, the blue light having exited out of each of the collimator lenses 530 is slightly divergent because the first collimator lens array 53 is shifted toward the laser light source apparatus 100a so that the first collimator lens array 53 and the laser emitting portions 52a are in the defocused state as described above.

The first collector lens 60 is a convex lens. The light incident on the first collector lens 60 converges onto the rotary diffuser plate 70. The light having exited out of the first collector lens 60 is focused on the rotary diffuser plate 70 and forms a secondary light source image 120. That is, the secondary light source image formation system 50 forms the secondary light source image 120 on the optical path between the laser light source apparatus 100a and the light modulator 400B. The secondary light source image 120 in the present embodiment has an elliptical shape having a longitudinal direction parallel to the vertical direction (Z-axis direction), as shown in FIG. 2. In other words, the secondary light source image 120 is so shaped that the length thereof in the direction perpendicular to the central intersection line C of the cross dichroic prism 500 (Z-axis direction), which will be described later, is longer than the length thereof in the direction parallel to the central intersection lines C.

Now, assume that a light flux cross section that is perpendicular to the light traveling direction and contains the secondary light source image 120 is superimposed on a light flux cross section that is perpendicular to the light traveling direction and contains the central intersection line C of the cross dichroic prism 500 to form an superimposed cross section. The direction of the central intersection line C of the cross dichroic prism 500 with respect to the secondary light source image 120 is defined by the direction of the central intersection line C with respect to the secondary light source image 120 in the superimposed cross sections.

The shape of the thus formed secondary light source image 120 will be described in more detail.

Figure 3:
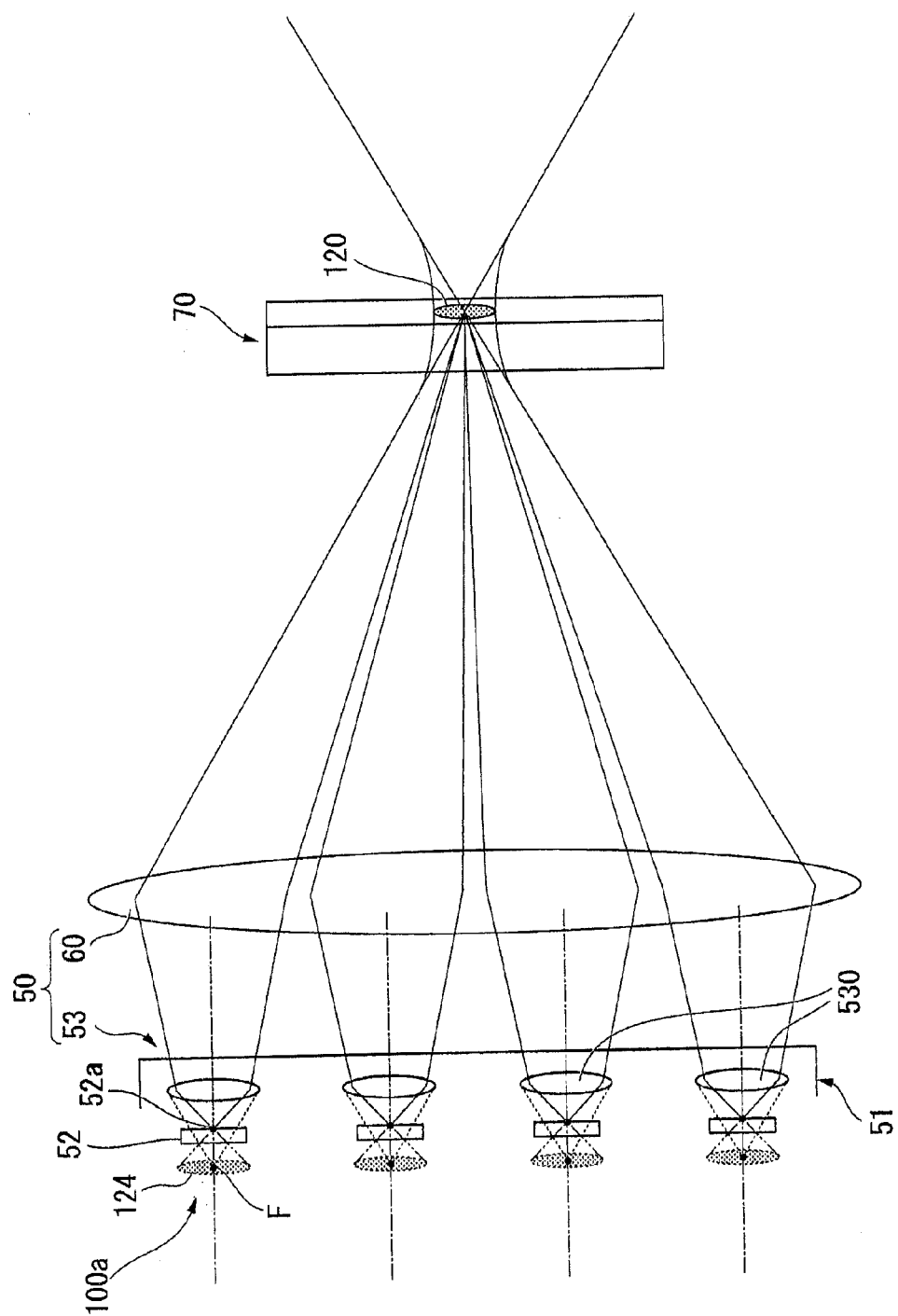
FIG. 3 is a diagrammatic view showing a secondary light source image formation system in the first embodiment.

FIG. 3 is a diagrammatic view showing the secondary light source image formation system 50 in the present embodiment.

The shape of the secondary light source image 120 is similar to the shape of an equivalent light source image 124 in the position of a focal point F of each of the collimator lenses 530, as shown in FIG. 3. The equivalent light source image 124 is a light source image in a case where it is assumed that a light source image is formed at the focal point F of each of the collimator lenses 530, which are in the defocused state. The shape of the equivalent light source image 124 is an imaginary shape of the laser light from the laser light source apparatus 100a in a position set apart by the distance from the laser emitting portion 52a of each of the first solid-state light emitting devices 52 to the focal point F of the corresponding collimator lens 530.

The shape of light emitted from a semiconductor laser typically changes with distance from the position where the laser light is emitted. The shape of the light within a range where the distance from the laser emitting portion 52a is relatively short (NFP: near field pattern) is the same as the shape of the laser emitting portion 52a. In the present embodiment, since the laser emitting portion 52a has a slit-like shape, the NFP has a slit-like shape so configured that the length thereof in the horizontal direction (direction perpendicular to Z axis) is longer than the length thereof in the vertical direction (Z-axis direction).

On the other hand, the light in a position set apart from the laser emitting portion 52a by a predetermined distance (FFP) has a shape that spreads in a predetermined direction due to an optical diffraction effect. In the present embodiment, the FFP has an elliptical shape that spreads in the width direction of the NFP because the NFP has a slit-like shape. That is, the FFP of the light from each of the first solid-state light emitting devices 52 in the present embodiment is so shaped that the length of the FFP in the vertical direction is longer than the length thereof in the horizontal direction. The longitudinal direction of the NFP and the longitudinal direction of the FFP are perpendicular to each other.

In the present embodiment, the shape of each of the equivalent light source images 124 is similar to the shape of the FFP of the light from the corresponding first solid-state light emitting device 52 because the position of the laser emitting portion 52a is shifted from the position of the focal point F of the corresponding collimator lens 530 by a predetermined distance, as shown in FIG. 3. The shape of the secondary light source image 120 is therefore similar to the shape of the FFP of the light from the first solid-state light emitting device 52. As a result, the secondary light source image 120 has the shape described above, that is, the shape so configured that the length thereof in the direction perpendicular to the central intersection line C of the cross dichroic prism 500, which will be described later, is longer than the length thereof in the direction parallel to the central intersection line C.

Referring back to FIG. 1, the rotary diffuser plate 70 as a diffuser member is a transmissive rotary diffuser plate that diffuses blue light incident thereon and causes the diffused light to exit through the surface facing away from the light incident side. The rotary diffuser plate 70 has a substrate 71 as the diffuser member driven and rotated by a motor 73. The substrate 71 can be a known diffuser plate, for example, a ground glass plate, a holographic diffuser, a transparent substrate having a blasted surface, and a transparent substrate that has scatterers, such as beads, dispersed therein and causes the scatterers to scatter light. In the present embodiment, a circular plate is used as the substrate 71, but the substrate 71 does not necessarily have a circular shape. The rotary diffuser plate 70 is so configured that rotating the substrate 71 causes the blue light to move relative to a blue light irradiation target area S1 in such a way that the portion irradiated with the blue light draws a circle.

The light having exited out of the rotary diffuser plate 70 is incident on the first pickup system 80.

The first pickup system 80 is disposed on the optical path between the first fly's eye optical integration system 90 and the rotary diffuser plate 70. The first pickup system 80 includes a first lens 81, which serves as a pickup lens on which the light from the rotary diffuser plate 70 is incident, and a second lens 82, which parallelizes the light having exited out of the first lens 81. The first lens 81 is formed, for example, of a plano-convex lens having a flat light incident surface and a convexly curved light exiting surface, and the second lens 82 is formed, for example, of a convex lens. The first pickup system 80 parallelizes the light from the rotary diffuser plate 70 and causes the parallelized light to be incident on the first fly's eye optical integration system 90.

The first pickup system 80 is so designed that the refractive index and the shape of each of the lenses that form the first pickup system 80 are determined in accordance with the degree of spread of the blue light having exited out of the rotary diffuser plate 70. Further, the number of lenses that form the first pickup system 80 is not limited to two and can be one or three or more.

Figure 4:
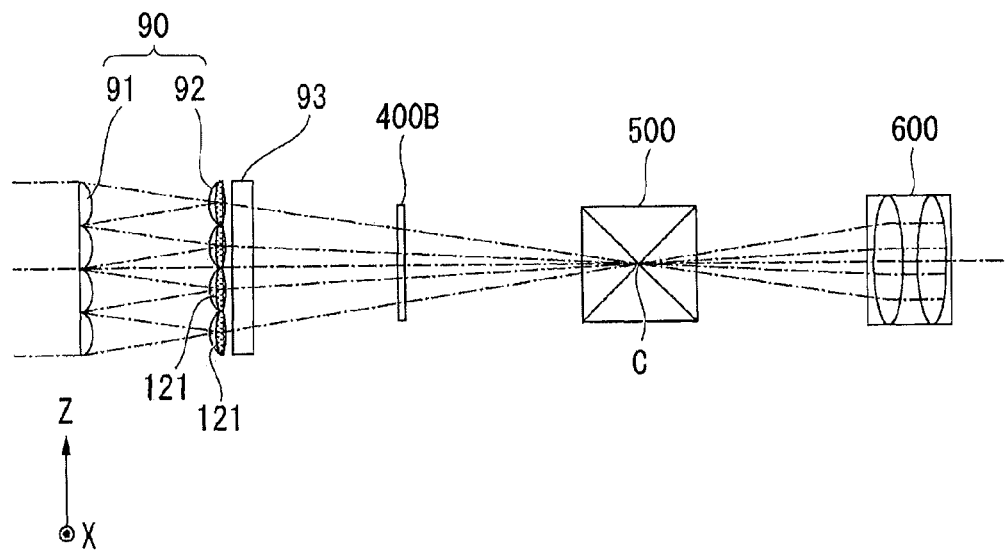
FIG. 4 is a diagrammatic view showing part of the projector according to the first embodiment.
Figure 5:
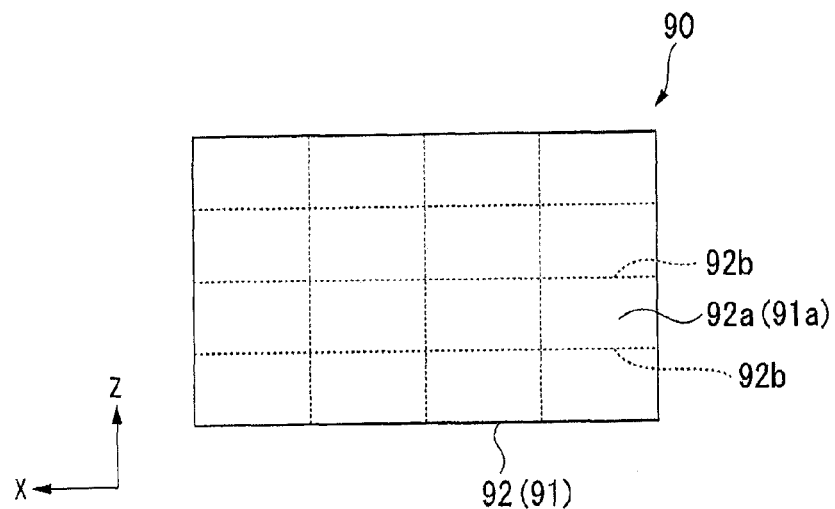
FIG. 5 is a plan view showing a first fly's eye optical integration system in the first embodiment.

FIG. 4 is a side view diagrammatically showing light incident on the central intersection line C of the cross dichroic prism 500. FIG. 5 is a plan view (in ZX-plane) of a first fly's eye lens 91 and a second fly's eye lens 92, which are shown in FIG. 4, viewed from the side where the cross dichroic prism 500 is present.

In FIG. 4, some members are omitted as appropriate, and the members shown in FIG. 4 are, for example, so rearranged as appropriate that light travels in a single direction (right-left direction in FIG. 4).

In FIGS. 4 and 5 and FIGS. 6A and 6B to 10, which will be described later, the direction parallel to the central intersection line C of the cross dichroic prism 500 is called an X-axis direction.

Although will be described later in detail, the light incident on the first fly's eye optical integration system 90 is then incident on the cross dichroic prism 500 via the first polarizing beam splitter 93 and the light modulator 400B, as shown in FIG. 4. The cross dichroic prism 500 is so disposed that the central intersection line C is parallel to the horizontal direction but perpendicular to the direction in which the light incident on the cross dichroic prism 500 travels.

The first fly's eye optical integration system 90 homogenizes the optical intensity distribution of the light incident thereon, as shown in FIGS. 4 and 5. The first fly's eye optical integration system 90 includes the first fly's eye lens 91, which serves as a tertiary light source image formation system, and the second fly's eye lens 92, which serves as a lens array. Each of the first fly's eye lens 91 and the second fly's eye lens 92 has a plurality of lenses arranged in a plane. In the present embodiment, a plurality of lenses 91a provided in the first fly's eye lens 91 are arranged in a matrix in the X-axis and Z-axis directions, as shown in FIG. 5. A plurality of lenses 92a provided in the second fly's eye lens 92 are also arranged in a matrix, as in the case of the first fly's eye lens 91. In the present embodiment, each of the first fly's eye lens 91 and the second fly's eye lens 92 has 16 lenses.

Each of the plurality of lenses 91a, which form the first fly's eye lens 91, and the plurality of lenses 92a, which form the second fly's eye lens 92, is formed, for example, of a plano-convex lens having a flat surface on one side and a convexly curved surface on the other side. The first fly's eye lens 91 and the second fly's eye lens 92 are so disposed that the convexly curved surfaces of the constituent lenses face each other.

Figure 6A:
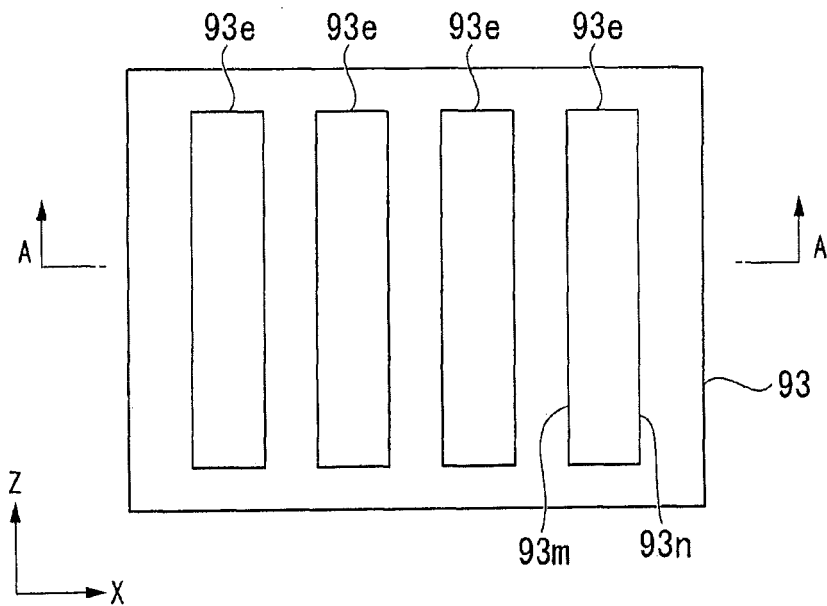
FIGS. 6A and 6B show a first polarizing beam splitter in the first embodiment.
Figure 6B:
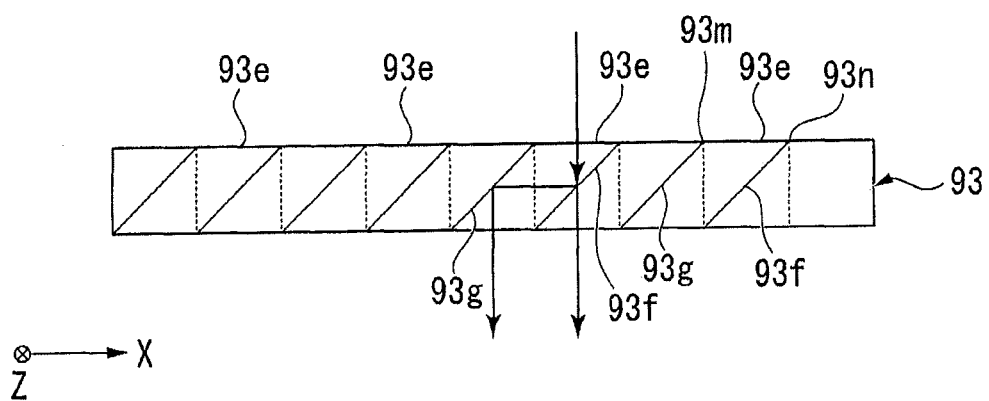

FIG. 6A is a plan view (in ZX plane) of the first polarizing beam splitter 93 viewed from the side where the second fly's eye lens 92 is present in FIG. 4, and FIG. 6B is a cross-sectional view of the first polarizing beam splitter 93 taken along the line A-A in FIG. 6A. The first polarizing beam splitter 93 has a plurality of light incident areas 93e, as shown in FIG. 6A. In the present embodiment, the first polarizing beam splitter 93 has four light incident areas 93e. Further, each of the light incident areas 93e has an edge 93m and an edge 93n, which extend in the Z-axis direction.

The first polarizing beam splitter 93 includes a polarization separation film 93f, on which light having passed through each of the light incident areas 93e is incident, and a reflection film 93g, on which light reflected off the polarization separation film 93f is incident, as shown in FIG. 6B. Although not shown, a wave plate is provided on the optical path of the light having passed through each of the polarization separation films 93f or the optical path of the light reflected off each of the reflection films 93g. The thus configured first polarizing beam splitter 93 converts the light incident thereon into linearly polarized light polarized in a single direction and outputs the polarized light.

Figure 7:
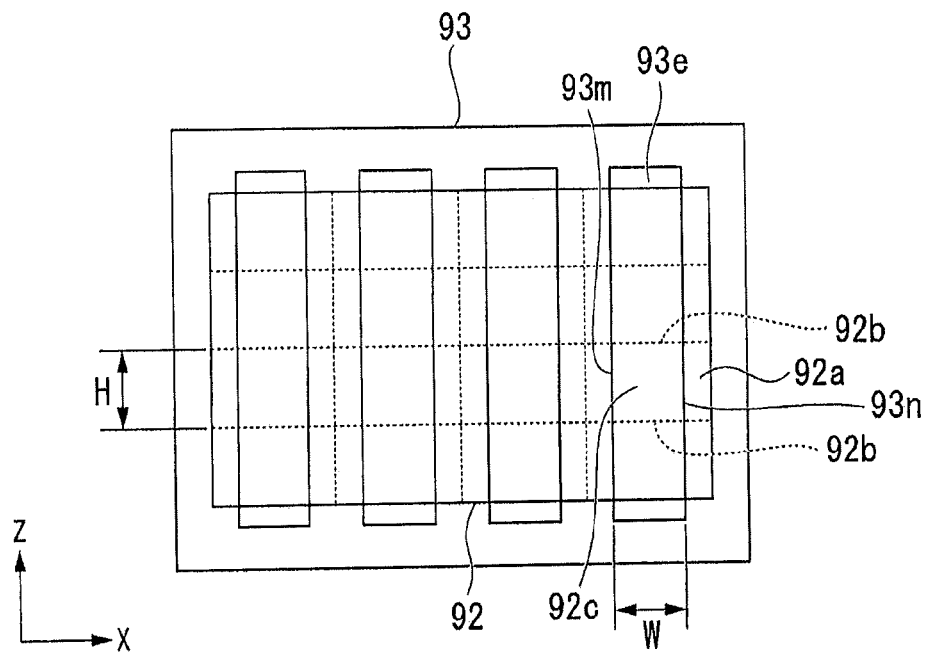
FIG. 7 shows light incident ports in the first embodiment.

FIG. 7 shows light incident ports 92c defined by the second fly's eye lens 92 and the first polarizing beam splitter 93. More specifically, FIG. 7 shows the second fly's eye lens 92 and the first polarizing beam splitter 93 viewed from the side where the first fly's eye lens 91 is present in FIG. 4.

In the second fly's eye lens 92, a boundary line 92b is defined by a line representing an end portion of each of the lenses 92a that extends in the X-axis direction, as shown in FIGS. 5 and 7. In the present specification, an area defined by the edges 93m and 93n of each of the light incident areas 93e and two boundary lines 92b adjacent to each other is called a light incident port 92c of the second fly's eye lens 92 for convenience. In the present embodiment, 16 rectangular light incident ports 92c are defined, as shown in FIG. 7.

The plurality of light incident ports 92c corresponds to the respective lenses 91a. The first fly's eye lens 91 divides light incident thereon into a plurality of light fluxes. The light flux having exited out of each of the lenses 91a travels toward the light incident port 92c corresponding to the lens 91a.

Figure 8:
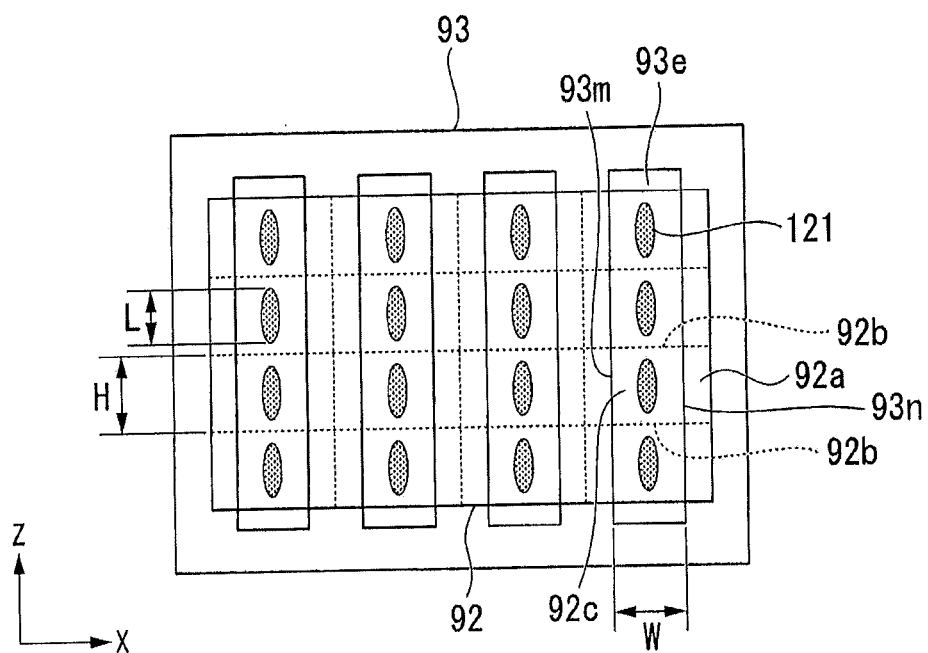
FIG. 8 shows an example of tertiary light source images in the first embodiment.

FIG. 8 shows the second fly's eye lens 92 and the first polarizing beam splitter 93 as well as tertiary light source images 121 formed by the first fly's eye lens 91 on the second fly's eye lens 92, which are viewed from the side where the first fly's eye lens 91 is present.

The light incident from the first fly's eye lens 91 on each of the light incident ports 92c of the second fly's eye lens 92 forms the tertiary light source image 121, as shown in FIG. 8. The tertiary light source image 121 formed on each of the light incident ports 92c exits out of the second fly's eye lens 92 toward the corresponding light incident area 93e of the first polarizing beam splitter 93.

The shape of each of the tertiary light source images 121 is similar to the shape of the secondary light source image 120, that is, the tertiary light source image 121 is so shaped that the length thereof in the direction perpendicular to the direction of the central intersection line C of the cross dichroic prism 500 is longer than the length thereof in the direction parallel to the central intersection line C. With an increase in the length L of the tertiary light source image 121 in the Z-axis direction, the divergent angle of the light that passes through the central intersection line C increases, leading to larger diffusion of the shadow, which is formed by the central intersection line C, in the direction perpendicular to the central intersection line C of the cross dichroic prism 500. When diffused, the shadow becomes lighter, whereby a viewer of an image is unlikely to recognize the shadow.

As described above, according to the present embodiment, the degree of influence of a shadow of the central intersection line C of the cross dichroic prism 500 can be effectively reduced. In other words, since the shape of the tertiary light source images 121 is similar to the shape of the secondary light source image 120, the degree of influence of a shadow of the central intersection line C of the cross dichroic prism 500 can be effectively reduced as long as the length of the secondary light source image 120 is sufficiently long in the Z-axis direction.

The length L of the tertiary light source image 121 is, for example, greater than or equal to 50% but smaller than or equal to 110% of the length of the light incident port 92c in the vertical direction (length in Z-axis direction).

The light incident on the first polarizing beam splitter 93 through the light incident areas 93e exits out thereof as linearly polarized light polarized in a single direction, as described above. The light having exited out of the first polarizing beam splitter 93 is parallelized by the first parallelizing lens 94 and exits out of the illumination unit 100.

The wavelength-conversion-type light source apparatus 100b includes a second light source 10, a second collimator lens array 13, a second collector lens 20, a second parallelizing lens 21, a dichroic mirror 22, a second pickup system 40, and a fluorescence emitting element 30. As will be described later, the wavelength-conversion-type light source apparatus 100b outputs non-laser light.

The second light source 10 includes a second base 11 and a plurality of second solid-state light emitting devices arranged on the second base 11. Each of the second solid-state light emitting devices 12 is a light source that emits excitation light that excites a fluorophore 32 provided in the fluorescence emitting element 30. In the description of the present embodiment, each of the second solid-state light emitting devices 12 is a semiconductor laser that emits blue laser light (intensity of emitted light peaks at about 460 nm) as the excitation light but is not limited thereto. Each of the second solid-state light emitting devices 12 may, for example, be a light source that emits light the intensity of which peaks at a wavelength other than 460 nm or an LED or a lamp that emits light other than laser light to the extent that emitted light can excite the fluorophore 32.

The second collimator lens array 13 has a plurality of collimator lenses 130 corresponding to the second solid-state light emitting devices 12 in a one-to-one relationship. The plurality of collimator lenses 130 are arranged on the second base 11. Each of collimator lenses 130 is disposed on the optical axis of the excitation light emitted from the corresponding second solid-state light emitting device 12 and parallelizes the excitation light. The excitation light having exited out of the second collimator lens array 13 is collected by the second collector lens 20, which is formed of a convex lens.

The second parallelizing lens 21, which is formed of a biconcave lens, is disposed on the optical path of the excitation light between the second collector lens 20 and the dichroic mirror 22. The second parallelizing lens 21 is disposed in a position between the second collector lens 20 and the focal position of the second collector lens 20, parallelizes the excitation light incident through the second collector lens 20, and outputs the parallelized excitation light toward the dichroic mirror 22.

The dichroic mirror 22 is disposed on the optical path of the light having exited out of the second parallelizing lens 21, and the surfaces of the dichroic mirror 22 are inclined to the direction of the optical path of the light having exited out of the second parallelizing lens 21 by about 45°. The surface of the dichroic mirror 22 on which the light having exited out of the second parallelizing lens 21 is incident faces the second pickup system 40. The dichroic mirror 22 reflects the excitation light (blue light component) incident through the second parallelizing lens 21 at a deflection angle of 90° toward the second pickup system 40, whereas transmitting fluorescence (red light component and green light component) incident through the second pickup system 40.

The second pickup system 40 substantially parallelizes the fluorescence from the fluorescence emitting element 30 and causes the parallelized fluorescence to be incident on the dichroic mirror 22. Further, a first lens 41 and a second lens 42 of the second pickup system 40 also have a function of collecting the excitation light incident from the dichroic mirror 22 and cause the collected excitation light to be incident on the fluorescence emitting element 30. That is, the second collimator lens array 13, the second collector lens 20, the second parallelizing lens 21, the dichroic mirror 22, and the second pickup system 40 form a second light collection system 15, which collects a plurality of excitation light fluxes emitted from the second light source 10.

The second pickup system 40 is so designed that the refractive index and the shape of each of the lenses that form the second pickup system 40 are determined in accordance with the degree of spread of the fluorescent emitted from the fluorescence emitting element 30. Further, the number of lenses that form the second pickup system 40 is not limited to two and can be one or three or more.

The fluorescence emitting element 30 is a reflective fluorescence emitting element that emits fluorescence along the same path along which the excitation light is incident. The fluorescence emitting element 30 includes a substrate 31, which is driven and rotated by a motor 33, and the fluorophore 32, which is formed on a surface of the substrate 31. The substrate 31 is made of a material that reflects the fluorescence emitted from the fluorophore 32. The substrate 31 is preferably made of a metal material having high thermal conductivity, such as Al, which allows the substrate 31 to function as a heat dissipating plate. The fluorophore 32 is formed in a ring shape along the direction of rotation of the substrate 31 in correspondence with the area on which the excitation light is incident. In the present embodiment, a circular plate is used as the substrate 31, but the substrate 31 does not necessarily have a circular shape.

The fluorophore 32 contains a particulate florescent material (fluorophore particle) that absorbs the excitation light outputted from the second solid-state light emitting devices 12 and emits fluorescence. The fluorophore 32 has a function of absorbing excitation light having a wavelength of about 460 nm (blue light) and converting the absorbed excitation light into fluorescence ranging from about 490 to 750 nm (intensity of emitted light peaks at 570 nm). The fluorescence contains green light (having wavelength of about 530 nm) and red light (having wavelength of about 630 nm).

The fluorophore particle can be a typically known YAG-based (yttrium-aluminum-garnet-based) fluorophore. For example, a YAG-based fluorophore having a composition expressed by $(Y, Gd)_3(Al, Ga)_5O_{12}:Ce$ and having an average diameter of 10 μm can be used. The fluorophore particle may be made of one type of material, or mixed particles made of two or more types of material may be used as the fluorophore particles.

The excitation light (blue light) collected by the first lens 41 and the second lens 42 is incident on the fluorescence emitting element 30 through the surface of the fluorophore 32. The fluorescence emitting element 30 outputs the red light and the green light (fluorescence) emitted from the fluorophore 32 toward the same side on which the excitation light is incident. The fluorescence emitting element 30 is so configured that rotating the substrate 31 causes the excitation light to move relative to an excitation light irradiation target area S2 in such a way that the portion of the fluorophore 32 that is irradiated with the excitation light draws a circle.

The light outputted from the fluorescence emitting element 30 is parallelized by the second pickup system 40 and incident on the dichroic mirror 22. The dichroic mirror 22 receives the light incident through the second pickup system 40 in such a way that the dichroic mirror 22 reflects and removes the excitation light (blue light) and transmits the green light and the red light. The wavelength-conversion-type light source apparatus 100b thus outputs green non-laser light and red non-laser light.

The light outputted from the wavelength-conversion-type light source apparatus 100b is incident on the second fly's eye optical integration system 190. The second fly's eye optical integration system 190 includes a third fly's eye lens 191 and a fourth fly's eye lens 192. The second fly's eye optical integration system 190 is the same as the first fly's eye optical integration system 90. The second fly's eye optical integration system 190 homogenizes the optical intensity distribution of the light incident thereon. The red light and the green light having exited out of the second fly's eye optical integration system 190 are converted by the second polarizing beam splitter 193 into linearly polarized light polarized in a single direction, parallelized by the third parallelizing lens 194, and then outputted from the illumination unit 100.

As described above, the illumination unit 100 outputs the red light and the green light, each of which is non-laser light, and the blue light, which is laser light.

Part of the light outputted from the illumination unit 100, specifically, the blue light outputted from the laser light source apparatus 100a is incident on the reflective polarizer 210. The reflective polarizer 210 is disposed on the optical path of the light having exited out of the first parallelizing lens 94, and the surface of the reflective polarizer 210 is inclined to the direction of the optical path of the light having exited out of the first parallelizing lens 94 by about 45°. The reflective polarizer 210 transmits light polarized in the polarization direction provided by the first polarizing beam splitter 93 and reflects light polarized in the direction perpendicular to the polarization direction. The blue light incident on the reflective polarizer 210 therefore passes through the reflective polarizer 210 and then enters the light modulator 400B.

On the other hand, the other part of the light outputted from the illumination unit 100, specifically, the red light and the green light outputted from the wavelength-conversion-type light source apparatus 100b are incident on the dichroic mirror 230. The dichroic mirror 230 is disposed on the optical path of the light having exited out of the third parallelizing lens 194, and the surface of the dichroic mirror 230 is inclined to the direction of the optical path of the light having exited out of the third parallelizing lens 194 by about 45°. The dichroic mirror 230 transmits red light and reflects green light. The red light incident on the dichroic mirror 230 therefore passes through the dichroic mirror 230 and impinges on the reflective polarizer 220. The green light incident on the dichroic mirror 230 is reflected off the dichroic mirror 230 at a deflection angle of about 90° and incident on the reflective polarizer 240.

The reflective polarizer 220 and the reflective polarizer 240 are disposed on the optical paths of the red light and the green light having exited out of the dichroic mirror 230 in such a way that the surfaces of the reflective polarizers are inclined by about 45° to the directions in which the red light and the green light travel. Each of the reflective polarizers 220 and 240 transmits light polarized in the polarization direction provided by the second polarizing beam splitter 193 and reflects light polarized in the direction perpendicular to the polarization direction, as in the case of the reflective polarizer 210.

The red light and the green light having passed through the reflective polarizer 220 and the reflective polarizer 240 are incident on the light modulator 400R and the light modulator 400G, respectively.

The light modulator 400R, the light modulator 400G, and the light modulator 400B, which modulate color light fluxes incident thereon in accordance with image information to form a color image, are targets to be illuminated by the illumination unit 100. The light modulator 400R, the light modulator 400G, and the light modulator 400B perform optical modulation on the color light fluxes incident thereon.

Each of the light modulator 400R, the light modulator 400G, and the light modulator 400B can be a typically known device, for example, a reflective liquid crystal light valve including a liquid crystal device or any other light modulator.

A liquid crystal device is, for example, a reflective light modulator formed of a pair of substrates that encapsulate and seal a liquid crystal material and uses a poly-silicon TFT as a switching device to modulate the polarization direction of incident light in accordance with provided image information.

The blue light incident on the light modulator 400B is optically modulated by the liquid crystal device into blue image light (third image light), reflected off the liquid crystal device in the direction opposite to the traveling direction of the incident light, and outputted from the light modulator 400B. Part of the blue image light outputted from the light modulator 400B, specifically, a polarized light component polarized in the direction perpendicular to the polarization direction of the blue light incident on the light modulator 400B is reflected off the reflective polarizer 210 at a deflection angle of about 90° and incident on the cross dichroic prism 500.

On the other hand, the red light incident on the light modulator 400R is converted into red image light (first image light) and incident on the cross dichroic prism 500, as in the case of the blue light. The green light incident on the light modulator 400G is converted into green image light (second image light) and incident on the cross dichroic prism 500, as in the case of the blue light.

The cross dichroic prism 500 is an optical element that combines the modulated image light fluxes outputted from the light modulators 400R, 400G, and 400B with one another to form a color image. The cross dichroic prism 500 is formed by bonding four rectangular prisms to each other and hence has a substantially square shape in a plan view. In the present embodiment, the cross dichroic prism 500 is so disposed that the central intersection line C formed by bonding the rectangular prisms to each other is parallel to the horizontal direction and perpendicular to the direction in which the light incident on the cross dichroic prism 500 travels, as shown in FIG. 4.

Dielectric multilayer films are formed on substantially X-shaped interfaces between the bonded rectangular prisms. The dielectric multilayer film formed on one of the substantially X-shaped interfaces reflects red light, and the dielectric multilayer film formed on the other interface reflects blue light. The red light and the blue light are so deflected by the dielectric multilayer films that the traveling directions of the deflected red light and blue light are aligned with the traveling direction of the green light, as shown in FIG. 1. The three color light fluxes are thus combined with one another.

The color image light having exited out of the cross dichroic prism 500 is enlarged and projected by the projection system 600 and forms an image on a screen SCR.

According to the projector 1000 of the present embodiment, the secondary light source image 120 of the laser light source apparatus 100a has the shape of the FFP of the light from each of the first solid-state light emitting devices 52, and the longitudinal direction of the FFP and the central intersection line C of the cross dichroic prism 500 are so set that they are perpendicular to each other. The configuration described above allows the length of the secondary light source image 120 to be sufficiently long in the direction perpendicular to the central intersection line C, whereby the degree of influence of a shadow of the central intersection line C of the cross dichroic prism 500 can be reduced. A detailed description will be made below.

Figure 9A:
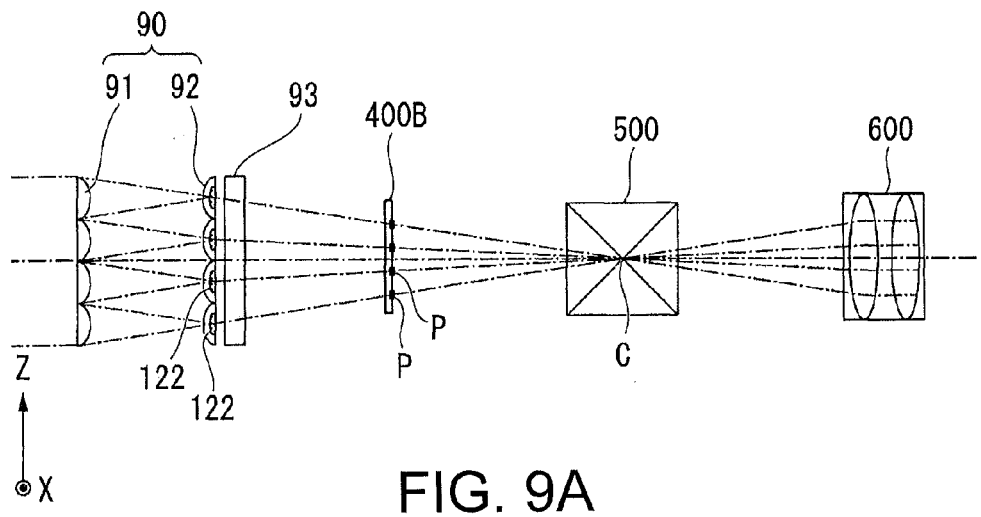
FIGS. 9A to 9C are diagrammatic views each showing part of a projector according to Comparative Example.
Figure 9B:
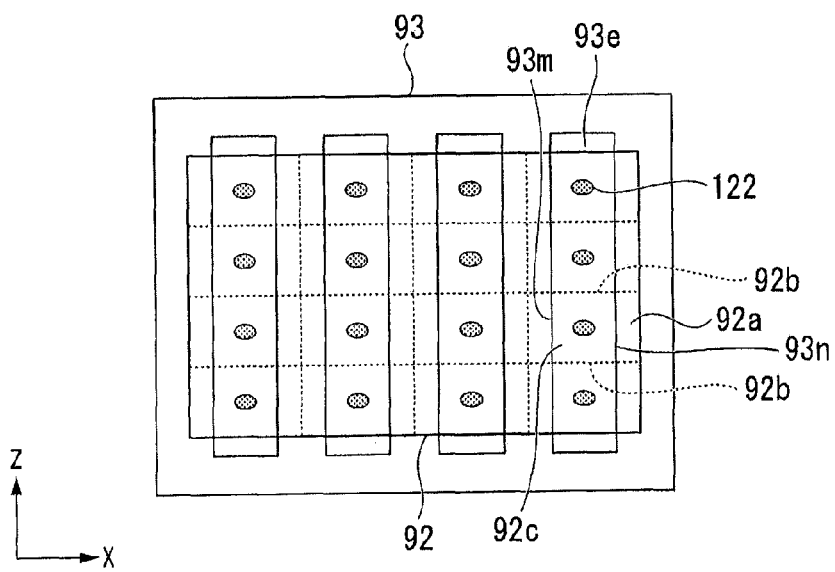
Figure 9C:
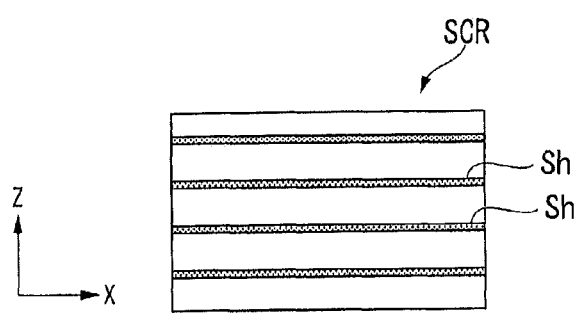

FIG. 9A is a side view diagrammatically showing part of the configuration of a projector according to Comparative Example. FIG. 9B shows the light incident ports 92c and tertiary light source image 122 in Comparative Example. FIG. 9C shows an image displayed on the screen SCR in Comparative Example.

In FIG. 9A, some members are omitted as appropriate and the orientation and other factors of each member are so changed as appropriate that light travels in a single direction (right-left direction in FIG. 9A), as in FIG. 4.

Comparative Example differs from the present embodiment in that the position of each slit-shaped laser emitting portion of the laser light source apparatus coincides with the focal position of the first collimator lens array.

In Comparative Example, since the position of each laser emitting portion of the laser light source apparatus coincides with the focal position of the first collimator lens array, the shape of the formed secondary light source image is similar to the shape of the NFP of the light from the laser light source apparatus. That is, the secondary light source image in Comparative Example is so shaped that the length thereof in the direction parallel to the central intersection line C of the cross dichroic prism 500 is longer than the length thereof in the direction perpendicular to the central intersection line C of the cross dichroic prism 500.

As a result, in Comparative Example, each of the tertiary light source images 122, which has a shape similar to the shape of the secondary light source image, is so shaped that the length thereof in the horizontal direction (X-axis direction) is longer than the length thereof in the vertical direction (Z-axis direction), that is, the length thereof in the direction parallel to the central intersection line C of the cross dichroic prism 500 is longer than the length thereof in the direction perpendicular to the central intersection line C, as shown in FIG. 9B.

FIG. 9A shows part of the light having exited out of the first polarizing beam splitter 93, specifically, light fluxes passing through the central intersection line C of the cross dichroic prism 500. The cross-sectional shape of each of the light fluxes is similar to the shape of the corresponding tertiary light source image 122. Since the longitudinal direction of the tertiary light source images 122 is parallel to the central intersection line C of the cross dichroic prism 500, each of the light fluxes almost entirely passes through the central intersection line C of the cross dichroic prism 500. Each of the light fluxes that passes through the central intersection line C and is projected through the projection system 600 therefore forms a thin, dark shadow Sh of the central intersection line C on the screen SCR, as shown in FIG. 9C. That is, a streak-shaped, thin, dark shadow Sh is formed on the screen SCR in a position corresponding to a light incident position P (see FIG. 9A) on the light modulator 400B on which the light flux is incident. As a result, streak-shaped unevenness may be visually recognized on the screen SCR, resulting in a decrease in quality of an image displayed by the projector in some cases.

In contrast, according to the present embodiment, each of the tertiary light source images 121 is so shaped that the length thereof in the direction perpendicular to the central intersection line C of the cross dichroic prism 500 is longer than the length thereof in the direction parallel to the central intersection line C, as shown in FIG. 8. The length L of the tertiary light source images 121 can therefore be long enough to reduce the degree of influence of a shadow of the central intersection line C of the cross dichroic prism 500. As a result, the degree of influence of a shadow formed on the screen SCR is reduced. Therefore, according to the present embodiment, the degree of influence of a shadow of the central intersection line C of the cross dichroic prism 500 can be reduced, whereby the quality of an image displayed by the projector can be improved.

Figure 10:
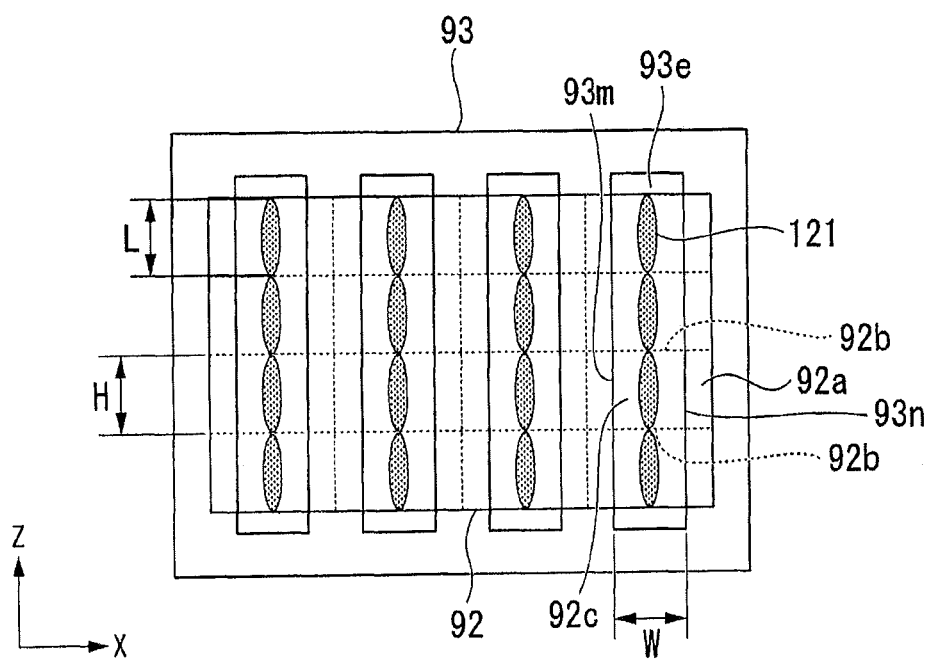
FIG. 10 shows another example of the tertiary light source images in the first embodiment.

FIG. 10 shows the second fly's eye lens 92 and the first polarizing beam splitter 93 as well as the tertiary light source images 121 formed on the second fly's eye lens 92 viewed from the side where the first fly's eye lens 91 is present in a case where the length L of the tertiary light source images 121 is set at a large value.

The effect of reducing the degree of influence of a shadow of the central intersection line C increases with the degree of spread of the light, which passes through the central intersection line C, in the direction perpendicular to the central intersection line C. Therefore, for example, setting the tertiary light source images 121 in such a way that the length L thereof is equal to the length H of the light incident port 92c and the tertiary light source image 121 does not extend off the light incident port 92c as shown in FIG. 10 allows more effective reduction in the degree of influence of a shadow of the central intersection line C of the cross dichroic prism 500.

Further, according to the present embodiment, the width of the tertiary light source image 121 is set to be smaller than the width W (see FIG. 7) of the light incident port 92c in the horizontal direction. In other words, the length of the tertiary light source image 121 in the direction parallel to the central intersection line C of the cross dichroic prism 500 is smaller than the width W of the light incident port 92c in the direction parallel to the central intersection line C. Therefore, it is possible to prevent edges of the light incident on the light incident area 93e of the first polarizing beam splitter 93 through the corresponding light incident port 92c from being trimmed away by the edge 93m or 93n of the light incident area 93e of the first polarizing beam splitter 93 in the width direction (horizontal direction). As a result, according to the present embodiment, a decrease in light usage efficiency can be suppressed.

In the present embodiment, the following configurations can also be employed.

In the present embodiment described above, the wavelength-conversion-type light source apparatus 100b outputs two types of color light, red light and green light, but the configuration described above is not necessarily employed. For example, in the present embodiment, a light source apparatus that outputs red light (first light source apparatus) and a light source apparatus that outputs green light (second light source apparatus) may be separately provided. In other words, in the present embodiment, the following three light source apparatus may be provided: a light source apparatus that outputs red light (first light source apparatus); a light source apparatus that outputs green light (second light source apparatus); and a laser light source apparatus that outputs blue light (third light source apparatus).

Further, in the present embodiment, two or more light source apparatus each of which outputs a laser light beam may be provided. In this case, collimator lenses on which the respective laser light beams are incident are disposed in defocus positions shifted by predetermined amounts.

The directions described above with respect to the central intersection line C are defined on the assumption that the cross-sectional shape of the light flux emitted from each of the first solid-state light emitting devices 52 is preserved. In a case where the cross-sectional shape is not preserved, the shape of the light flux is so adjusted that the longitudinal direction thereof is perpendicular to the central intersection line C by, for example, rotating the light flux in a portion along the optical path between the first solid-state light emitting device 52 and the cross dichroic prism 500.

In the present embodiment described above, in which the secondary light source image 120 of the first solid-state light emitting devices 52 is an FFP of the light therefrom, the secondary light source image 120 is so shaped that the longitudinal direction thereof is perpendicular to the central intersection line C of the cross dichroic prism 500, but the configuration described above is not necessarily employed.

In the present embodiment, the light emitted from each of the first solid-state light emitting devices 52 may be rotated around the light traveling direction by 90° in a portion between the first solid-state light emitting device 52 and the cross dichroic prism 500 to shape the light incident on the cross dichroic prism 500 in such a way that the longitudinal direction thereof is perpendicular to the central intersection line C.

In the present embodiment, the light emitted from each of the first solid-state light emitting devices 52 may be so shaped that the shape thereof is, for example, expanded in the direction perpendicular to the central intersection line C in a portion between the first solid-state light emitting device 52 and the cross dichroic prism 500 to change the shape of the light incident on the cross dichroic prism 500 in such a way that the longitudinal direction of the shape is perpendicular to the central intersection line C.

Second Embodiment

A second embodiment differs from the first embodiment in that the shape of the secondary light source image is the same as the shape of the NFP of the light from the laser light source apparatus.

In the following description, the same components as those in the embodiment described above have the same reference characters as appropriate and no description of the same components will be made in some cases.

Figure 11A:
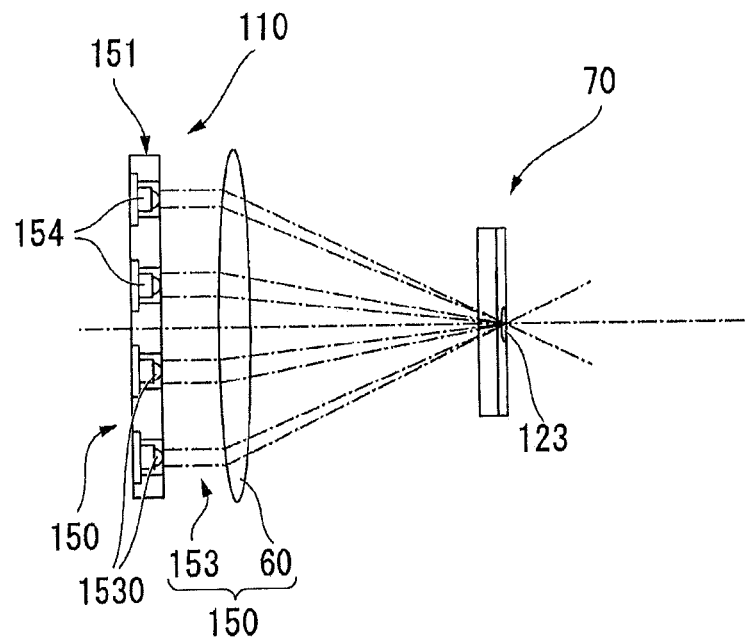
FIGS. 11A and 11B are diagrammatic views showing a laser light source apparatus and a secondary light source image formation system in a second embodiment.
Figure 11B:
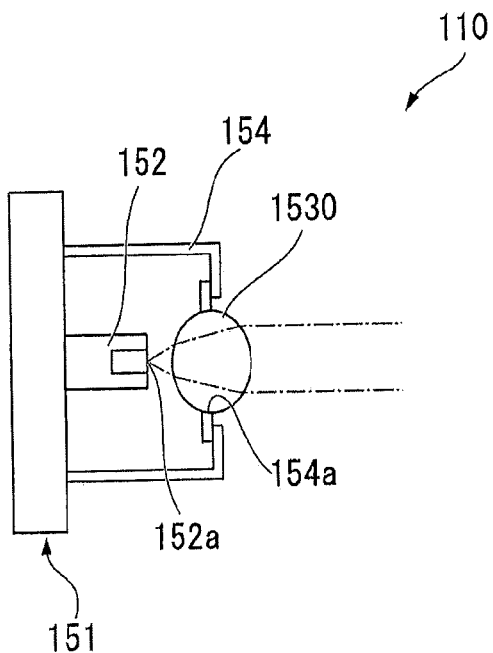
Figure 12:
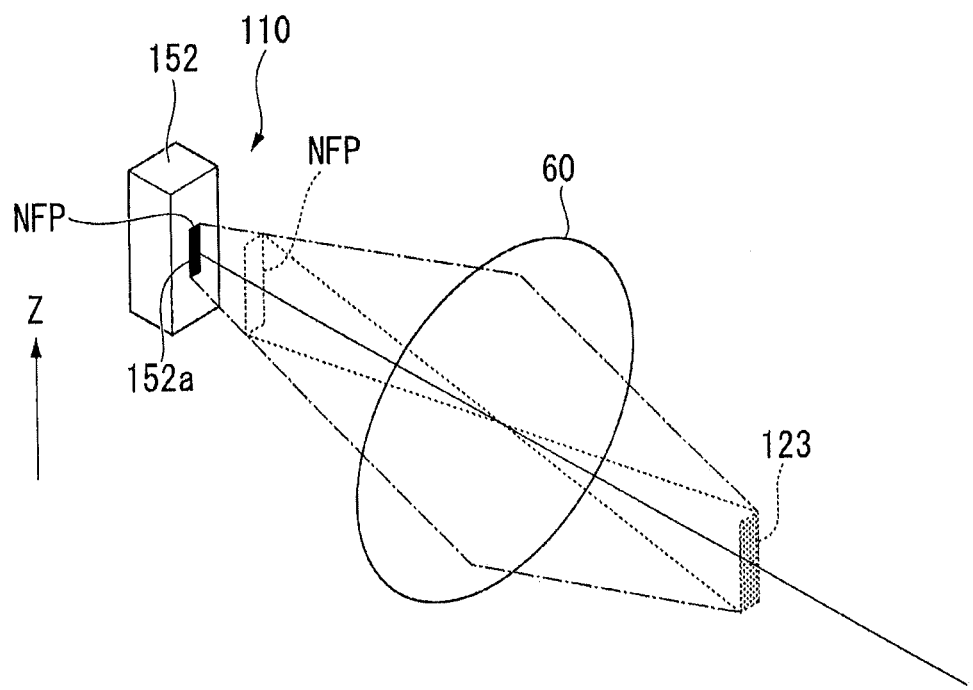
FIG. 12 is a diagrammatic view showing cross-sectional shapes of light outputted from the laser light source apparatus in the second embodiment.

FIGS. 11A and 11B are diagrammatic views showing a laser light source apparatus 110 and a secondary light source image formation system 150 of the present embodiment. FIG. 12 is a diagrammatic view showing the shape of light emitted from a solid-state light emitting device 152.

The laser light source apparatus 110 according to the present embodiment includes a base 151, solid-state light emitting devices 152, which are provided on the base 151, and a package 154, which surrounds the circumference of each of the solid-state light emitting devices 152, as shown in FIGS. 11A and 11B. The package 154 has an opening 154a, which opens towards the first collector lens 60. A collimator lens 1530 is so provided in the opening 154a of the package 154 that the collimator lens 1530 blocks the opening 154a. The collimator lens 1530 is so disposed that the focal position thereof coincides with the position of a laser emitting portion 152a of the corresponding solid-state light emitting device 152. In the present embodiment, the collimator lens 1530 is, for example, a collimator lens having a short focal length.

Each of the solid-state light emitting devices 152 is so disposed that the longitudinal direction of the laser emitting portion 152a, which has a slit-like shape, coincides with the vertical direction (Z-axis direction), as shown in FIG. 12.

That is, the longitudinal direction of the laser emitting portion 152a of each of the solid-state light emitting devices 152 is perpendicular to the central intersection line C of the cross dichroic prism 500. The cross dichroic prism 500 is disposed in the same manner as in the first embodiment.

The laser light emitted from each of the solid-state light emitting devices 152 passes through the corresponding collimator lens 1530 and enters the first collector lens 60, as shown in FIG. 11A. The light having entered the first collector lens 60 is so collected that a secondary light source image 123 is formed on the rotary diffuser plate 70. The secondary light source image 123, which has the same shape as the shape of a light source image in the focal position of the collimator lens 1530, has the shape of the NFP of the light from the solid-state light emitting device 152, that is, the same shape as the shape of the laser emitting portion 152a, as shown in FIG. 12. The secondary light source image 123 is therefore so shaped that the length thereof in the direction perpendicular to the central intersection line C of the cross dichroic prism 500 (Z-axis direction) is longer than the length thereof in the direction parallel to the central intersection line C.

The size of the secondary light source image 123 is determined in accordance with optical magnification determined by the ratio between the focal length of the collimator lens 1530 and the focal length of the first collector lens 60. In the present embodiment, the optical magnification is set at a large value by using a collimator lens having a short focal length as the collimator lens 1530. The optical magnification is, for example, greater than or equal to 20 but smaller than or equal to 100.

According to the present embodiment, the secondary light source image 123 can be so shaped that the length thereof in the direction perpendicular to the central intersection line C of the cross dichroic prism 500 (Z-axis direction) is longer than the length thereof in the direction parallel to the central intersection line C, as in the first embodiment. The length of the secondary light source image 120 (tertiary light source images 121) in the direction perpendicular to the central intersection line C (length L of tertiary light source images 121) can therefore be sufficiently long, whereby the degree of influence of a shadow of the central intersection line C of the cross dichroic prism 500 can be reduced.

EXAMPLES

Example 1

The present example corresponds to the first embodiment.

In the following description, the size of each member or any other portion is expressed in the form of the rightward/leftward (horizontal) length×upward/downward (vertical) length in some cases.

A laser light source apparatus in the present example outputs blue laser light having a wavelength of 460 nm. The laser light source apparatus has slit-shaped laser emitting portions. The size of each of the laser emitting portions is 15 µm×1 µm. The NFP of the light from the laser light source apparatus therefore has a slit-like shape. The laser light source apparatus was so disposed that the longitudinal direction of the laser emitting portions was parallel to the horizontal direction. A vertical divergence angle of a beam is 40°, and a horizontal divergence angle of the beam is 10°.

The focal length of each of the collimator lenses was set at 14 mm, and the focal length of the first collector lens was set at 115 mm. The optical magnification provided by the collimator lens and the first collector lens is 8.2. The laser light source apparatus was disposed between the focal position of the collimator lens and the collimator lens, and the amount of defocus was set at 200 µm.

The focal length of the first pickup system was set at 12.5 mm, and the focal length of the first fly's eye lens was set at 21 mm. Each of the first fly's eye lens and the second fly's eye lens has a plurality of plano-convex lenses arranged in a plane and has an aspect ratio of 16:9.

The second fly's eye lens has a plurality of light incident ports 92c (see FIG. 7). The size of each of the light incident ports 92c was set at 2.2 mm×2.5 mm (width W×length H).

The cross dichroic prism was so disposed that the central intersection line thereof was parallel to the horizontal direction.

Since the collimator lenses are disposed in a defocused position, each of the equivalent light source images has the shape of the FFP of the light from the laser light source apparatus. The size of each of the equivalent light source images was 50 µm×146 µm. The size of the secondary light source image formed on the rotary diffuser plate is equal to a magnified size of the equivalent light source images by a factor of the optical magnification provided by the collimator lenses and the collector lens. The size of the secondary light source image was therefore 0.41 mm×1.2 mm. It is therefore ascertained that according to the present example, the secondary light source image is so shaped that the length thereof in the direction perpendicular to the central intersection line C of the cross dichroic prism is longer than the length thereof in the direction parallel to the central intersection line C.

The size of the tertiary light source images formed by the second fly's eye lens is equal to a magnified size of the secondary light source image by a factor of the optical magnification determined by the ratio between the focal length of the first pickup system and the focal length of the first fly's eye lens. The size of the tertiary light source images in the present example was therefore 0.69 mm×2.02 mm. In other words, the length L of the tertiary light source image in the direction perpendicular to the central intersection line C of the cross dichroic prism was about 81% of the length H of the light incident port 92c.

As a result of observation of video images projected on the screen by the thus configured projector according to the present example, it was ascertained that the degree of influence of a shadow of the central intersection line of the cross dichroic prism was sufficiently reduced.

Further, in the present example, since the size of the tertiary light source images is smaller than the size of the light incident ports 92c both in the upward/downward direction and the rightward/leftward direction, substantially overall light having exited out of the first fly's eye lens is allowed to enter the light incident areas 93e of the first polarizing beam splitter through the second fly's eye lens (see FIG. 7). The projector provided in accordance with the present example therefore excels in light usage efficiency.

In the present example, the length L of the tertiary light source image was set to be about 81% of the length H of the light incident port 92c, but the length L is not necessarily set as described above. Setting the length L of the tertiary light source image to be greater than or equal to 50% but smaller than or equal to 100% of the length H of the light incident port 92c can provide a projector that not only allows reduction in the degree of influence of a shadow of the central intersection line of the cross dichroic prism but also excels in light usage efficiency.

When the length L of the tertiary light source image is greater than or equal to 50% of the length H of the light incident port 92c, the shadow is so greatly diffused that the area where the shadow is displayed is at least 50% of an entire image projected on the screen. According to the configuration described above, the shadow is more unlikely to be recognized than in a case where the shadow appears in the form of thin lines in an image in Comparative Example.

On the other hand, when the length L of the tertiary light source image is greater than or equal to 80% of the length H of the light incident port 92c, the shadow is so further greatly diffused that the shadow nearly occupies the entire image projected on the screen. According to the configuration described above, the shadow becomes further lighter and is hence hardly recognized.

Variation 1

The present variation differs from Example 1 in that the amount of defocus of the position of the collimator lenses is changed.

The amount of defocus of the position of collimator lenses in the present variation was set at 250 µm.

In the configuration, the size of the equivalent light source images was 59 µm×183 µm. The size of the secondary light source image was 0.48 mm×1.5 mm. The size of the tertiary light source images was 0.81 mm×2.52 mm. That is, the length L of the tertiary light source image was about 101% of the length H of the light incident port 92c.

As a result of observation of video images projected on the screen by the thus configured projector according to the present variation, it was ascertained that the degree of influence of a shadow of the central intersection line of the cross dichroic prism is reduced by a greater amount than in Example 1.

In the present variation, since the length of the tertiary light source images in the upward/downward direction is slightly greater than the length of the light incident ports 92c in the upward/downward direction, each of the tertiary light source images extends off the corresponding light incident port 92c by a small amount. Since the light components that do not enter the light incident port 92c cannot be used for image formation, the light usage efficiency slightly decreases. However, the degree of influence of a shadow of the central intersection line of the cross dichroic prism can be further reduced, as described above.

In the present variation, the length L of the tertiary light source image is set to be about 101% of the length H of the light incident port 92c, but the length L is not necessarily set as described above. Setting the length L of the tertiary light source image to be smaller than or equal to 110% of the length H of the light incident port 92c allows effective reduction in the degree of influence of a shadow of the central intersection line of the cross dichroic prism with sufficient light usage efficiency ensured.

Variation 2

The present example corresponds to the second embodiment.

The laser light source apparatus used in the present example is the same as that used in Example 1. The laser light source apparatus is so disposed that it is rotated by 90° around the path along which light exits, unlike the laser light source apparatus in Example 1. That is, the laser light source apparatus is so disposed that the longitudinal direction of each laser emitting portion of the laser light source apparatus is parallel to the vertical direction. The cross dichroic prism is disposed in the same manner as in Example 1. As a result, in the present example, the longitudinal direction of each laser emitting portion of the laser light source apparatus is perpendicular to the direction of the central intersection line of the cross dichroic prism.

A lens having a short focal length was used as each collimator lens. The focal length of each of the collimator lenses is 2.0 mm. Each of the collimator lenses was so disposed that the focal position of the collimator lens coincides with the position of the corresponding laser emitting portion of the laser light source apparatus. The focal length of the first collector lens was set at 160 mm. The collimator lens and the first collector lens provide an optical magnification of 80. The first pickup system, the first fly's eye lens, and the first polarizing beam splitter were the same as those in Example 1.

In the present example, since the collimator lenses are not located in a defocused position, the secondary light source image has the shape of a light source image at each of the laser emitting portions of the laser light source apparatus, that is, the shape of the NFP of the light from the laser light source apparatus. Since the size of the secondary light source image formed on the rotary diffuser plate is equal to the size of a light source image in the focal position of each of the collimator lenses, that is, a magnified size of each of the laser emitting portions of the laser light source apparatus by a factor of the optical magnification provided by the collimator lens and the collector lens, the size of the secondary light source image was 0.08 mm×1.2 mm. As a result, according to the present example, it was ascertained that the secondary light source image is so shaped that the length thereof in the direction perpendicular to the central intersection line C of the cross dichroic prism is longer than the length thereof in the direction parallel to the central intersection line C.

Further, in the present example, the size of the tertiary light source image was 0.13 mm×2.02 mm. In other words, the length L of the tertiary light source image in the direction perpendicular to the central intersection line C of the cross dichroic prism is about 81% of the length H of the light incident port 92c.

As a result of observation of video images projected on the screen by the thus configured projector according to the present example, it was ascertained that the degree of influence of a shadow of the central intersection line of the cross dichroic prism is sufficiently reduced.

Further, in the present example, since the size of the tertiary light source images is smaller than the size of the light incident ports 92c both in the upward/downward direction and the rightward/leftward direction, substantially overall light having exited out of the first fly's eye lens is allowed to enter the light incident areas 93e of the first polarizing beam splitter via the second fly's eye lens. The projector provided in accordance with the present example thus excels in light usage efficiency.

The entire disclosure of Japanese Patent Application No. 2013-166670, filed on Aug. 9, 2013 is expressly incorporated by reference herein.

What is claimed is:

1. A projector comprising:
a first light source apparatus;
a second light source apparatus;
a laser light source apparatus;
a first light modulator that modulates light from the first light source apparatus to form first image light;
a second light modulator that modulates light from the second light source apparatus to form second image light;
a third light modulator that modulates light from the laser light source apparatus to form third image light, the light from the laser light source apparatus comprising laser light;

a cross prism that combines the first image light, the second image light, and the third image light with one another;

a projection system that projects light from the cross prism; and a secondary light source image formation system that forms a secondary light source image on an optical path between the laser light source apparatus and the third light modulator, wherein the secondary light source image is so shaped that the length thereof in a direction perpendicular to a central intersection line of the cross prism is longer than the length thereof in a direction parallel to the central intersection line.

2. The projector according to claim 1, wherein the secondary light source image formation system includes a collimator lens on which the light from the laser light source apparatus is incident and a collector lens that collects light having exited out of the collimator lens to form the secondary light source image.

3. The projector according to claim 2, wherein the laser light source apparatus has a slit-shaped laser emitting portion, the position of the slit-shaped laser emitting portion of the laser light source apparatus is shifted from a focal position of the collimator lens by a predetermined distance, and a longitudinal direction of the laser emitting portion of the laser light source apparatus is parallel to the central intersection line of the cross prism.

4. The projector according to claim 2, wherein the laser light source apparatus has a slit-shaped laser emitting portion, the position of the slit-shaped laser emitting portion of the laser light source apparatus coincides with a focal position of the collimator lens, and a longitudinal direction of the laser emitting portion of the laser light source apparatus is perpendicular to the central intersection line of the cross prism.

5. The projector according to claim 1, further comprising:

a tertiary light source image formation system on which light from the secondary light source image is incident and which forms a plurality of tertiary light source images; and a lens array having a plurality of light incident ports on which light from the tertiary light source image formation system is incident, wherein the length of each of the plurality of tertiary light source images in the direction perpendicular to the central intersection line of the cross prism is greater than or equal to 50% but smaller than or equal to 110% of the length of each of the plurality of light incident ports in the direction perpendicular to the central intersection line of the cross prism.

6. The projector according to claim 5, wherein the length of each of the plurality of tertiary light source images in the direction perpendicular to the central intersection line of the cross prism is greater than or equal to 50% but smaller than or equal to 100% of the length of each of the plurality of light incident ports in the direction perpendicular to the central intersection line of the cross prism.

7. The projector according to claim 6, wherein the length of each of the plurality of tertiary light source images in the direction perpendicular to the central intersection line of the cross prism is greater than or equal to 80% but smaller than or equal to 100% of the length of each of the plurality of light incident ports in the direction perpendicular to the central intersection line of the cross prism.

8. The projector according to claim 5, wherein the length of each of the plurality of tertiary light source images in the direction parallel to the central intersection line of the cross prism is smaller than the length of each of the plurality of light incident ports in the direction parallel to the central intersection line of the cross prism.

* * * * *